G. W. PARDEE.
DIRECTION SIGNAL FOR AUTOMOBILES.
APPLICATION FILED APR. 3, 1920.

1,355,061.

Patented Oct. 5, 1920.
2 SHEETS—SHEET 1.

G. W. Pardee.
INVENTOR
BY Victor J. Evans.
ATTORNEY

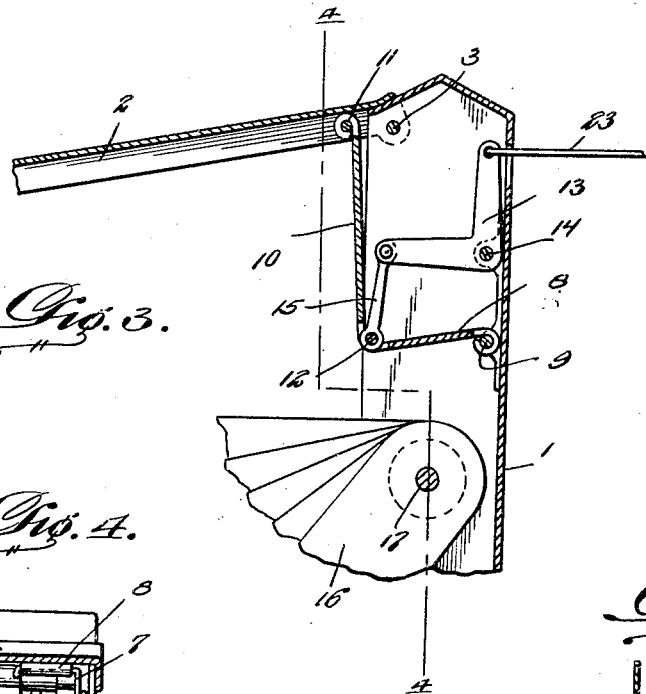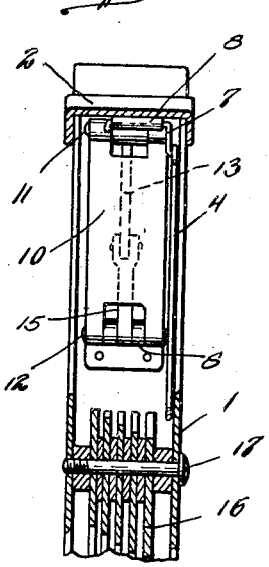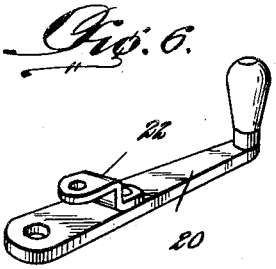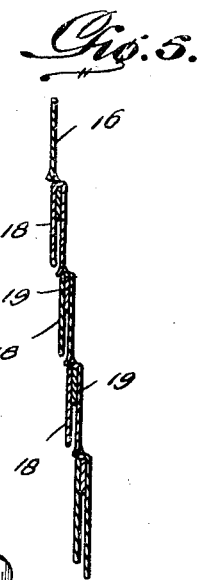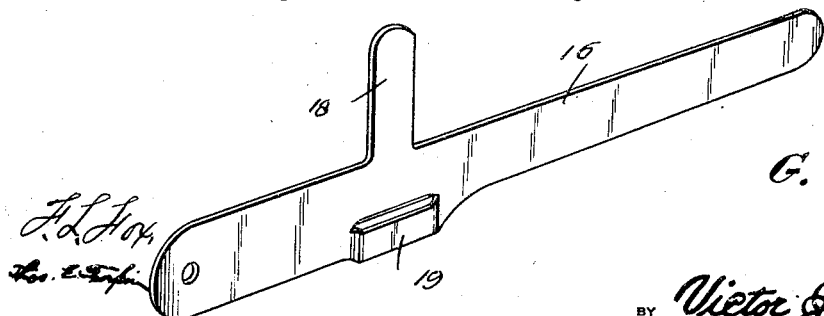

UNITED STATES PATENT OFFICE.

GEORGE W. PARDEE, OF WASHINGTON, DISTRICT OF COLUMBIA.

DIRECTION-SIGNAL FOR AUTOMOBILES.

1,355,061. Specification of Letters Patent. Patented Oct. 5, 1920.

Application filed April 3, 1920. Serial No. 371,067.

*To all whom it may concern:*

Be it known that I, GEORGE W. PARDEE, a citizen of the United States, residing at Washington, in the District of Columbia, have invented new and useful Improvements in Direction-Signals for Automobiles, of which the following is a specification.

The object of my present invention is the provision of a simple, inexpensive and efficient automobile direction signal, susceptible of ready application to an automobile and calculated to enhance rather than detract from the finished appearance of the automobile.

The invention also contemplates the provision of a signal arrangement whereby a driver is enabled to conveniently apprise those following him of his intention to turn to the left or to the right or to stop.

To the attainment of the foregoing the invention consists in the improvement as hereinafter described and definitely claimed.

In the accompanying drawings, hereby made a part hereof:—

Fig. 3 is a fragmentary vertical section illustrating the peculiar and advantageous connection of the actuating means to the cover of the casing in the left hand unit.

Fig. 4 is an enlarged detail section taken on the line 4—4 of Fig. 3.

Fig. 5 is an enlarged section showing the peculiar and advantageous interlocking of the gravitational blades of the left hand signal unit.

Fig. 6 is an enlarged perspective of one of the operating levers of the signal.

Fig. 7 is a perspective showing one of the signal blades as the same appears before its tongue is bent into hook form.

Similar numerals of reference designate corresponding parts in all of the views of the drawings.

Figure 2:
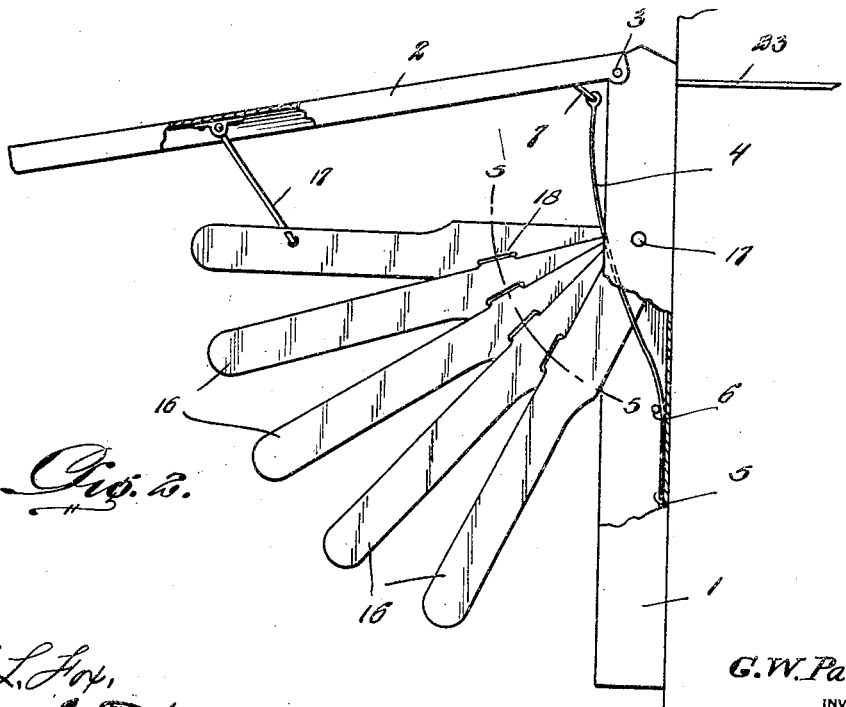
Fig. 2 is an enlarged detail view, partly in elevation and partly in section, showing the left hand signal unit as set.

In furtherance of my invention I arrange in upright position at opposite sides of an automobile body casings 1 which may be of sheet metal or any other approved material and may be affixed to the automobile body in any workman-like manner compatible with purpose of my invention. Each of the said casings is provided with a flanged cover 2 which is hinged to the casing at the point 3 so as to swing downwardly to closed position in which position it is adapted to exclude moisture from the interior of the casing. Each of the signal units at opposite sides of the automobile includes a casing 1 and a cover 2, and the said units are otherwise identical in construction. Therefore a detailed description of the left hand signal unit disclosed in Figs. 2 to 7 will suffice to impart a definite understanding of both units. For instance the particular unit referred to includes a spring 4 the tendency of which is to assist the downward movement of cover 2. The said spring 4 is connected at 5 to the casing 1, is arranged to bear against a projection 6 in the casing and is connected at its upper end to a crank 7, journaled at 8 in a barrel that is carried by the cover 2 at a point adjacent to the pivoted connection 3, Figs. 2 and 4. The particular signal unit referred to also includes a toggle lever, Fig. 3, through the medium of which the cover 2 is opened without interfering in any measure with the subsequent free and complete closing of the cover 2. The said toggle lever includes a member 8, hinged at 9 to the back of the casing 1, a member 10, hinged at 11 to the cover 2, and a pintle 12 by which the knuckles of the members 8 and 10 are pivotally connected together. A bell crank 13 is pivoted at 14 in the casing 1, and one arm of the bell crank is connected through a link 15 with the said pintle 12. The left hand unit alluded to also comprises a plurality of gravitational blades 16 each of which is preferably formed of a single piece of sheet metal. The said blades 16 are pivoted at 17 in the casing 1 and are arranged in parallel vertical planes so as to be susceptible of movement from within the casing 1 to the positions shown in Fig. 2 and vice versa. One of the blades 16 is connected by a link 10 to the cover 2, and it is therefore necessary to interlock and connect the several blades so that when the blade alluded to is opened the other blades will follow and will gravitationally assume the relative positions shown in Fig. 2. To this end I provide all of the blades 16 except the uppermost one with a hook 18, and I also provide all of the blades 16 except the lowermost one with a loop 19, Figs. 5 and 7, designed to loosely receive the pendent portion of the hook 18 of the next lower blade. From this it follows that when the cover 2 is swung into open position the several blades 16 will be opened in fan-like manner, Fig. 2; also, that when the cover 2 is moved downwardly the several blades will assume side by side pendent positions in the casing 1, or in other words the blades will be compactly nested in the casing 1.

Figure 1:
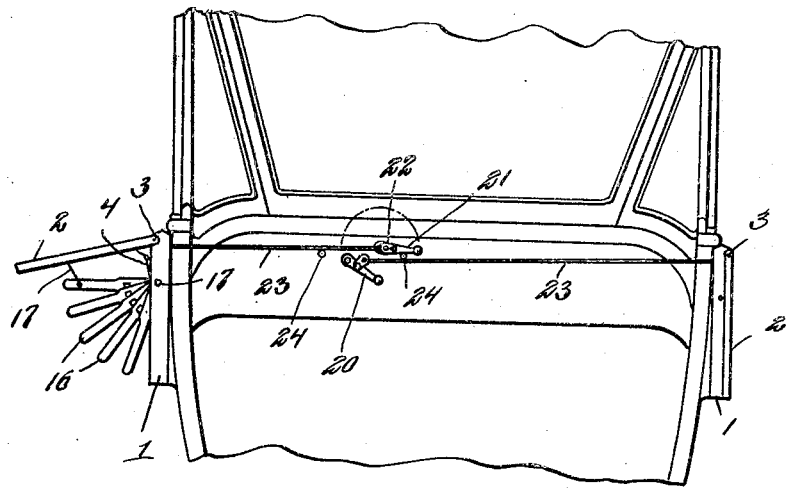
Figure 1 is a transverse view of a part of an automobile equipped with my improvement.

In combination with the toggle levers of the signal units at opposite sides of the automobile I employ operating levers 20 and 21, arranged in the automobile within convenient reach of the driver. Each of the said levers is provided at an intermediate point of its length with an offset apertured and pivoted portion 22 and each apertured and pivoted portion 22 is connected through a rod 23 with the upstanding arm of the bell crank 13 of its respective signal unit. The lever 21 is complementary to the left hand signal unit, and a stop 24 is provided for use in combination with said lever 21 to limit the downward movement of the lever after the point at which the rod 23 is connected to the lever portion 22 has passed the dead center. The advantage of this arrangement will be appreciated by reference to Fig. 1 in which it will be noted that when the lever 21 is positioned as stated to set the left hand unit, the said unit will be retained in the set position until the lever 21 is swung downwardly by the driver after the manner indicated by the dotted arc in Fig. 1. The lever 20 complementary to the right hand signal unit is swung to the left and upwardly for the setting of said unit, and when the lever 20 brings up against its stop 24 the right hand signal unit will be retained in the set position until the driver moves the lever 20 downwardly and toward the right. Manifestly when either of the levers 20 or 21 is moved to break the dead center referred to, its particular signal unit will be gravitationally closed and when either lever 20 or 21 is swung by the driver to a position against the stop complementary to the lever the particular signal unit of the lever will be set and will be retained in set position until the lever is moved by the driver to the idle position when the signal unit will be promptly closed and placed out of commission.

It will be apparent from the foregoing that my novel signal is adapted to be used to advantage in closed automobiles as well as in open automobiles, and that the setting or release of either signal unit entails but little effort on the part of the driver and is adapted to be expeditiously accomplished.

Having described my invention, what I claim and desire to secure by Letters-Patent, is:—

1. In an automobile direction signal of swinging blade type, the combination of a casing, a cover hinged at one end to the casing, a plurality of side by side blades pivoted in the casing and connected together and with the cover, a toggle lever having members pivotally connected together and pivotally connected at their outer ends in the casing and to the cover, respectively, and operating means connected to the toggle lever.

2. In an automobile direction signal of swinging blade type, the combination of a casing, a cover hinged at one end to the casing, a plurality of side by side blades pivoted in the casing and connected together and with the cover, a toggle lever having members pivotally connected together and pivotally connected at their outer ends in the casing and to the cover, respectively, a bell crank mounted in the casing, a link between the point of flexure of the toggle lever and one arm of the bell-crank, a crank pivotally connected to the cover, and a spring strip connected to the casing and said crank, and tending to close the cover.

3. The combination of an automobile, direction signal units of swinging type at opposite sides thereof, operating levers mounted in the automobile at points intermediate of the sides thereof, means connecting intermediate points of the levers and the signal units, and stops against which the levers bring up when said points are beyond the dead-centers.

4. In an automobile direction signal of plural swinging blade type, the combination of a casing, a cover pivoted thereto, blades arranged side by side in the casing and pivoted thereto, means whereby the blades are slidably interlocked, said means including a loop on one blade and a hook on the adjoining blade, the tongue of which hook is loosely disposed in the loop, and a connection between one blade and the cover.

5. In an automobile direction signal of swinging blade type, the combination of a casing, a cover hinged at one end to the casing, a plurality of side by side blades pivoted in the casing and connected together and with the cover, a toggle lever having members pivotally connected together and pivotally connected at their outer ends in the casing and to the cover, respectively a bell crank mounted in the casing, a link between the point of flexure of the toggle lever and one arm of the bell-crank, an operating lever mounted in the automobile at a point intermediate of the sides thereof, means connecting an intermediate point of the other arm of the bell-crank, and a stop against which the lever brings up when said point is beyond the dead-center.

In testimony whereof I affix my signature.

GEORGE W. PARDEE.